June 15, 1948.  J. BUSCARINO  2,443,415

DENTAL FLOSS HOLDER

Filed Sept. 18, 1946

INVENTOR.
JAMES BUSCARINO
BY William F. Nickel
HIS ATTORNEY

Patented June 15, 1948

2,443,415

UNITED STATES PATENT OFFICE 2,443,415

DENTAL FLOSS HOLDER

James Buscarino, New York, N. Y.

Application September 18, 1946, Serial No. 697,651

3 Claims. (Cl. 132—91)

This invention is an improvement in holders, and particularly a holder for a short length of dental floss or string to enable the user to clean his teeth more easily and remove small particles of food or other substances from the spaces between same.

An object of the invention is to provide a simple and very inexpensive article of this kind, adapted to be produced in small size and large quantities, and sold at low cost; and after use on one or more occasions discarded altogether because of sanitary considerations. When need again arises, another one, new and fresh, is selected by the owner from a supply which is kept on hand. To this end, the holder is made up and offered for sale in lots containing a greater or less number of holders; which are put in boxes receiving a dozen or more and offered to the buyer for a few cents per box.

The nature, objects and advantages of the invention are explained in the following specification; and the novel features are defined in the appended claims. But this disclosure is illustrative only and changes may be made in the embodiments actually shown without departing from the principle of the invention or going beyond the scope thereof.

All the views present the improvement on a somewhat enlarged scale.

The holder has the shape of a yoke, and comprises a pair of separate arms 1 and a handle 2. Between the ends of the arms 1 is a length of sterilized or medicated cord or string 3, such as the so-called dental floss, and this cord is drawn taut between the arms, so as to be in condition for use. Whenever a particle is to be removed from one's teeth, the handle 2 of the holder is grasped by the fingers, held in position to force the string 3 in between the teeth, and then displaced back and forth until the particle is dislodged.

Figure 1:
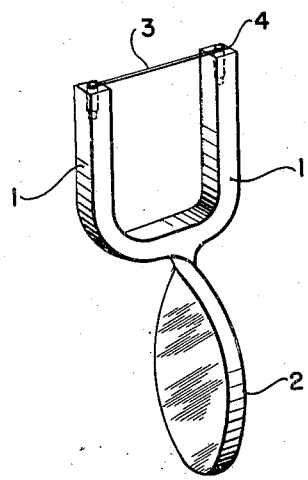
Figure 1 shows in perspective one form of the invention.

In the form shown in Figure 1, the length of dental floss 3 is permanently attached to the arms 1 by molding the ends of the string into the extremities of the arms when the device is manufactured; or by plugs or pegs 4 pressing the cord tightly into recesses in the extremities of the arms 1. The entire holder can be produced by molding it of some suitable non-brittle substance, such as plastic, and tinged to have any desired color.

Figure 2:
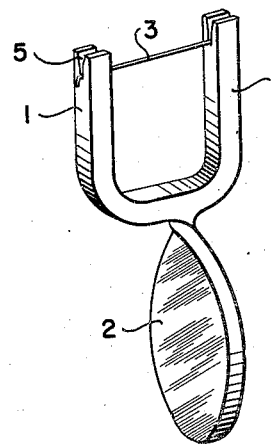
Figure 2 shows a modification of the construction thereof.

In the form of the invention shown in Figure 2, the arms 1 of the holder are shown as having notches 5 in the extremities thereof. These notches become narrower towards their inner ends, so that when a length of dental floss is put into place, the ends of the string are simply wedged into the notches and held fast, the string being stretched between the arms to the required extent.

Figure 3:
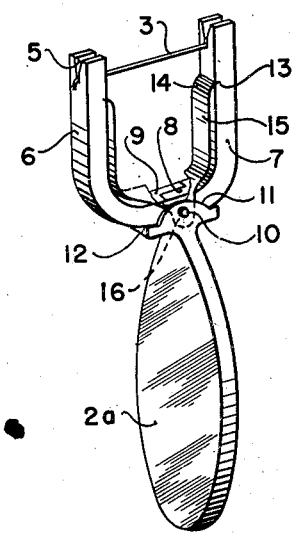
Figure 3 shows a third form.

In the embodiment of the invention shown in Figure 3, the arms 6 and 7 are movable and can be spread out to stretch the dental floss or string between them. To this end the curved arms 6 and 7 have rabbeted parts 8 and 9 respectively at a lower extremity; and the rabbeted parts are joined by a stud 10, which connects them together and forms a pivot about which the arms 6 and 7 can be moved. Below the arms is a handle 2a which has a pair of separated lugs 11 at the top to receive the connected ends of the arms 6 and 7 between them. These projections or lugs are also perforated to give passage to the rivet stud 8, and couple the handle to the arms 6 and 7.

At opposite sides of the handle just below the projections 11 are additional lateral projections 12, which abut the adjacent lower faces of the arms 6 and 7, and act as stops for the movement of these arms towards distended position.

The inner faces of the arms 6 and 7 may have small notches 13 near the outer extremities, and the arms are distended by a U-shaped spring 15, which has its ends 14 bent out and seated in the notches 13; and forces the arms apart so as to keep the string of dental floss 3 well stretched between them as before. To hold the spring 15 in position, it is provided in the middle of its length with ears or lugs 16, one at each side, which overlap the sides of the arms 6 and 7, and are perforated so that they also can give passage to the pivot stud 8 and be held in place thereby. The two halves of this spring urge the arms outward, to keep them in contact with the projections 12 on the handle 2a, preventing the dental floss 3 from becoming slack in the device, and at the same time the spring permits the arms to be pushed together when the string is to be replaced. The lugs 11 will overlie the ears 16.

The improvement is thus seen to be very simple in construction, and very inexpensive to produce. It is decidedly hygienic in character, and eliminates the need of touching or handling with the fingers any part of the surface of the string which is to be forced between the owner's teeth. Therefore when it is required for use, very safe operation is assured.

Having described my invention, what I believe to be new is:

1. A holder comprising a pair of arms which are pivotally connected together at one extremity; a handle joined to said arms adjacent said pivoted extremities, and a spring between said arms mounted to exert a force thereon to move them apart; said arms carrying a cord extending between them.

2. A holder comprising a pair of arms which are rabbeted at one extremity, said rabbeted extremities overlapping, a handle having separated lugs adjacent one end, said lugs receiving the overlapping extremities of the arms between them, a U-shaped spring between said arms, and having one or more projections adjacent the said rabbeted extremities, and a single pivot stud passing through said extremities, said lugs and said projections to hold the handle, the arms and the spring together.

3. The holder according to claim 2, wherein the handle has an additional lug at each side to abut the outer face of the adjacent arm near the pivot stud to oppose the effect of said spring.

JAMES BUSCARINO.

REFERENCES CITED

The following references are of record in the file of this patent:

UNITED STATES PATENTS

| Number | Name | Date |
| --- | --- | --- |
| 1,815,408 | Jordan | July 21, 1931 |
| 1,958,505 | Aki | May 15, 1934 |